Figure 1:
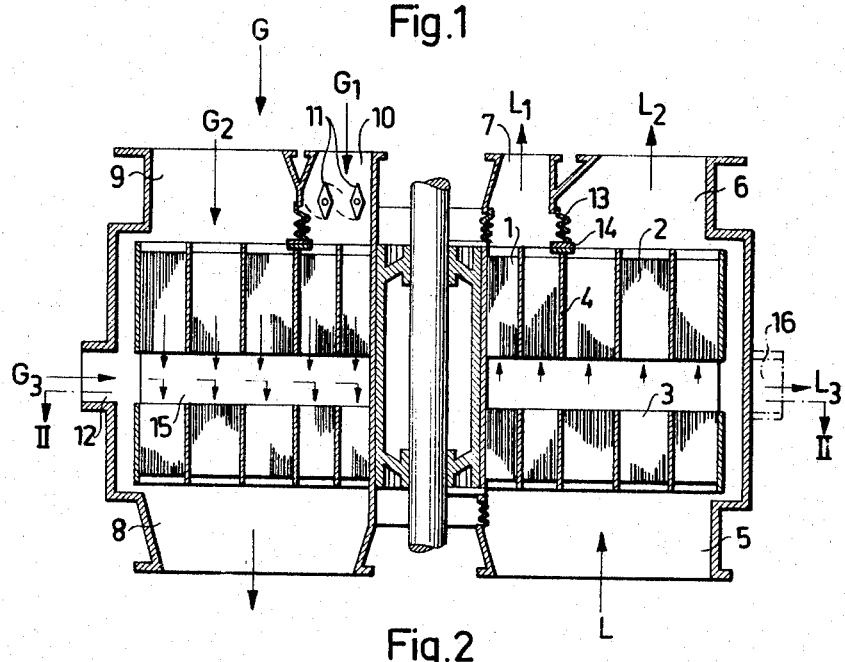

May 23, 1967     G. KALBFLEISCH ET AL     3,321,011

ROTARY REGENERATOR WITH SEPARATING ZONE

Filed March 16, 1965

INVENTORS
Georg Kalbfleisch
Alfred Kaltschmitt

BY Jarvis C. Marble

ATTORNEY

United States Patent Office 3,321,011
Patented May 23, 1967

3,321,011
ROTARY REGENERATOR WITH SEPARATING ZONE
Georg Kalbfleisch, Eppelheim, near Heidelberg, and Alfred Kaltschmitt, Leimen, Germany, assignors to Svenska Rotor Maskiner Aktiebolag, Nacka, Sweden, a corporation of Sweden
Filed Mar. 16, 1965, Ser. No. 440,148
3 Claims. (Cl. 165—7)

The present invention relates to rotary regenerative air preheaters of the type which comprises a casing in which is provided a regenerator body having axial passages for the flow of the heat exchanging media and more particularly to an embodiment of such air preheaters in which two or more parallel air flows are heated and discharged separately so that they can be used for different purposes. In such a design the regenerator body is subdivided by one or more cylindrical and coaxial walls into coaxial annular sections. This principle is disclosed for instance in U.S. Patent Ser. No. 2,899,179.

As air preheaters operating with flue gases as heating medium first of all are used for heating combustion air for big furnaces while the quantities of hot air required for other purposes are smaller it is appropriate when making the subdivision into two annular sections to dimension the outer annular section of the regenerator body larger than the inner one and to use this outer annular section for preheating the combustion air while the parallel smaller air flow passing the inner annular section is heated for other parts of the plant for instance for coal mills. The smaller air quantity passing the inner annular section is called the "first" air.

The reason for this is that this last mentioned air comes in contact with the fuel first, viz. in the coal mills or in the burners. The combustion air, however, is supplied in a later stage in the combustion chamber and is therefore called the "second" air.

The invention has for its object to provide a control of the first air temperature and also at load variations to guarantee a sufficiently high first air temperature while cooling the flue gases as much as possible which has been impossible in hitherto known air preheaters. This is achieved by the design described above.

The air preheater according to the invention may be incorporated in a boiler plant in different ways. Thus, for instance, branch conduits may be connected to the separating zones for supplying or withdrawing partial flows of the heat exchanging media. This makes it possible to connect in a manner known per se a feed water heater, a superheater, a pre-evaporator or the like in parallel with the hot stage of the air preheater on the flue gas side thereof and on the other hand it is also possible in known manner to connect a device of the type just mentioned between the hot end and the cold end. The partial flue gas flows resulting from the coaxial division of the hot stage are united and mixed in the separating zone following the divided stages and they then together pass the next stage or stages at the cold end of the air preheater. In case of a multidivided regenerator body the separating zone between the coaxially divided hot stages and the coaxially undivided stages at the cold end is of particular importance. However, branch conduits for supplying and withdrawal of partial flows of the heat exchanging media will be connected to any one of the separating zones.

Multistage air preheaters with coaxially divided regenerator bodies are well known. In these air preheaters the inner section of the regenerator body which serves to heat the first air passes uninterrupted from the cold to the hot end of the air preheater. If the temperature of the first air is adjusted on a lower value—due to a lower humidity of the coal to be burnt or due to a considerable reduction of the load—the result will be an intolerable reduction of the flue gas temperature at the cold end of the regenerator body passed by the first air. On the other hand if it is necessary to increase the temperature of the first air due to an increased load or due to increased humidity of the fuel mixtures the over-all gas temperature at the cold end of the air preheater will increase.

There are also other known arrangements in which one and the same air preheater is used for heating combustion air as well as a second air flow, for instance for the coal mills. These arrangements are impaired by other drawbacks and are also rather expensive.

According to the invention there is suggested a way to obviate all these drawbacks. It is particularly advantageous that in order to increase the temperature of the first air it is sufficient to increase the partial flue gas flow passing through the corresponding section of the regenerator body. In consequence of this the very detrimental increase of the gas temperature occurring in usual embodiments can not take place due to the undivided cold stage. In order to attain this it is sufficient to provide at the hot end of the air preheater in addition to the usual sector shaped seals an arc-shaped concentric element adapted to the coaxial division of the regenerator body and separating the two partial flows of air as well as of flue gases, said elements being aligned with the edge of the dividing cylinder and subdividing the air duct as well as the flue gas duct each in two separate ducts the cross-sectional areas of which are dimensioned substantially to accommodate the partial flows of air and flue gases.

Figure 2:
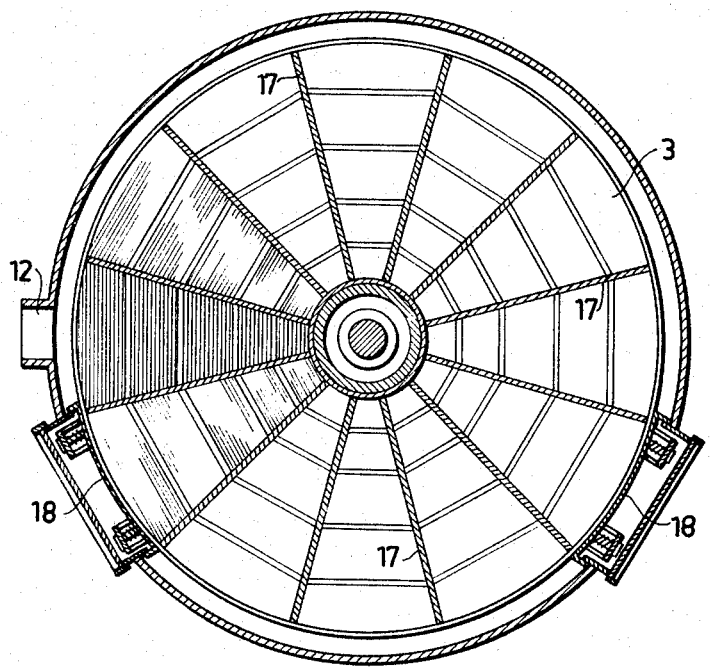

In order to illustrate the inventive idea an embodiment thereof is shown in the accompanying drawing in the form of an air preheater the regenerator body of which is divided into two stages. In the drawing FIG. 1 is a vertical section through the air preheater and FIG. 2 is a section taken on line II—II of FIG. 1.

The above and following discussions apply in the same manner to embodiments in which the cold stage shown and/or the hot stage (in the last mentioned stage naturally only with respect to its outer annular portion) are divided by further separating zones. In accordance with the case which in practice is first of all of interest it is assumed that a partial flow is branched from the hot flue gas flow supplied before the latter enters the air preheater and that this partial flow after having given off a portion of its heat for some useful purpose is in correspondingly cooled state supplied to the separating zone and thereafter completely cooled together with the flue gas flow from the hot stage in the following cold stage. In the same manner it is possible to withdraw a partial flue gas flow from the separating zone. Further it is also assumed that it is possible in a manner known per se to withdraw a partial air flow from the separating zone or in the same manner to introduce a partial air flow in said separating zone. If there are further separating zones also these zones may be utilized for supplying or withdrawing partial flows of the heat exchanging media.

From the drawing it appears that the regenerator body in the hot stage of the air preheater selected as an embodiment of the invention is divided coaxially in an inner annular section 1 and an outer annular section 2 by an inner wall 4. The cold stage 3 separated from the hot stage by the separating zone 15 need not be coaxially divided. It can be regarded as characteristic for the inventive idea that the stage at the cold end is coaxially undivided, which means that a mixing takes place in the separating zone so that in the cold stage also at the flue gas side there is no question of separating an inner flow from an outer flow.

According to the drawing the flue gas flow G is supplied to the air preheater from above and immediately before the preheater it is divided into two partial flows, viz. a main flue gas flow $G_2$ which through a duct 9 is introduced into the outer larger annular section 2 of the regenerator body, and a smaller flue gas flow $G_1$ which flows into the inner annular section 1 through a duct 10. In order to control the quantity of this partial flue gas flow $G_1$ there is provided a damper device 11. Thus, the smaller flue gas quantity $G_1$ passes through the damper device 11 to the inner section 1 of the hot stage of the regenerator body while the main flue gas quantity $G_2$ flows through the outer section 2 of this stage.

A further flue gas partial flow $G_3$ which already before has been branched from the hot flue gas flow and passed through some additional heat exchangers (feed water heater, pre-evaporator, superheater or the like) flows through a duct 12 into the separating zone 15. Here this partial flow $G_3$ joins the main flow $G_2$ as well as the other partial flow $G_1$ and after the mixing which takes place in the separating zone it flows through the cold stage 3 into the exhaust duct 8.

The whole air quantity L enters the cold stage 3 of the air preheater through a duct 5. After having passed this cold stage the air is divided into a smaller first air flow $L_1$ and a greater combustion air flow (the second air flow) $L_2$. A partial air flow $L_3$ may be withdrawn from the separating zone 15 by means of a duct 16. On the other hand air may also be supplied in this manner and after mixing with the main flow L it is divided up between the two annular sectons 1 and 2. The air flow $L_1$ flows from the inner annular section 1 through a duct 7 of the hot stage to the place where it is to be used while the other air flow $L_2$ when leaving the outer annular section 2 is conveyed through a duct 6 as combustion air.

In order for instance to increase the temperature of the first air, the damper device 11 is opened so that the flue gas flow $G_1$ which is in heat exchanging communication with the first air $L_1$ through the inner annular section 1 is increased. In this manner it is possible to sufficiently increase the temperature of the first air at load increase or at combustion of fuels having a higher humidity. On the other hand the temperature of the first air $L_1$ may be extremely decreased by throttling the gas flow $G_1$. This can be necessary at load variations or if a particularly dry fuel is used. If the damper device 11 is for instance fuly closed the temperature of the first air $L_1$ discharged through the duct 7 is equal to the temperature of the air flow L entering the separating zone 15 from the cold stage 3. In this case the flue gas flow $G_1$ is equal to nil and thus the flue gas flow $G_2$ corresponds to the total flue gas quantity G. At extremely strong heating or at extremely strong reduction of the temperature of the first air there will be only a small variation of the temperature of the flue gases discharged at the cold end if the sum of the flue gas quantities $G_1$ and $G_2$ is constant. This obviates the temperature falling below the dew point.

In the embodiment shown the regenerator body is in known manner divided by radial walls 17 into sector-shaped compartments which are filled with a heat exchanging mass in the form of plates providing axial channels for the media. In order to prevent mingling of gas and air the air preheater can be provided with sector plates at the ends of the regenerator body and axial sealing devices cooperating with the jacket of the regenerator body as shown for instance in US Patent 2,873,952, such axial sealing devices only being known at 18 in FIG. 2 as this low arrangement does not form any part of the present invention. The radial walls 17 extend uninterruped from the hot end to the cold end of the regenerator body and prevent peripheral flow within said body and above all in the separating zone thereof.

At the hot end of the regenerator body there are provided sealing means which separate the partial air flue $L_1$ from the partial air flue $L_2$ as well as the partial flue gas flow $G_1$ from the partial flue gas flow $G_2$. In the embodiment shown these sealing means comprise bellows-shaped yielding arcuate members 13 in combination with an annular sealing element 14 which is in sliding contact with a corresponding annular element at the top edge of the partition 4. Neither does this sealing arrangement form any part of the invention.

With an air preheater according to the invention it is possible to adapt the outlet temperature of the first air as desired to the requirements of the boiler operation. Extremely low as well as extremely high first air temperatures may be obtained while obviating a corresponding increase of the flue gas temperature as well as a decrease of said temperature down into the dew point range which is the case with hitherto usual constructions and assembling principles.

If a particularly high temperature of the air for the coal mills is required the flue gas flow $G_1$ has to be increased or its temperature at the entrance of the air preheater must be increased (by means of a further branch flow consisting of flue gases which have not been so strongly cooled). The partial flue gas flow $G_1$ enters the separating zone with a relatively high temperature but here it mingles with the partial flue gas flow $G_2$. The mixture $G_1+G_2$ leaves the cold stage with an unessentially higher temperature. On the other side, if the mill section extends uninterrupted from the hot end to the cold end the flue gas partial flow $G_1$ will be discharged with a considerably higher flue gas temperature.

The control of the first air temperature by means of dampers 11 involves a very simple solution and as compared with hitherto usual constructions it affords considerable simplifications of the arrangement. In addition to the reduction of the costs for the air preheater per se which is obtained by the simplification of the sealing means and the reduction of the costs of building there are further savings due to the elimination of by pass conduits hitherto required together with their control means.

In order to illustrate the invention has been chosen an embodiment of an air preheater in which the regenerator body rotates while the ducts are stationary. However, the above discussions apply in exactly the same way to air preheaters having a stationary regenerator body and rotating duct. This is only a question of a cinematic inversion for which there are known constructive possibilities.

What we claim is:

1. A rotary regenerative air preheater comprising a casing, a regenerator body in said casing having coaxial outer and inner cylindrical shells defining an annular space, a regenerative mass in said annular space forming axial passages for the flow of heat-exchanging media therethrough, means providing at least one separating zone in said regenerator body dividing said regenerator body and said axial passages into axially spaced heating stages and providing radial and axial flow therethrough, at least two radially spaced ducts at one end of the casing for supplying hot flue gases to a portion of said axial passages and at least two radially spaced ducts adjacent thereto forming outlets for heated air from another portion of said axial passages, a plurality of ducts at the opposite end of the casing for withdrawing cooled flue gases from and supplying cold air to the other end of said axial passages, respectively, with said ducts and said regenerator body being rotatable relative to each other, at least one cylindrical partition in the heating stage adjacent said gas supply and air outlet ducts for dividing said stage into coaxial annular sections for registering sequentially with the radially spaced openings of said gas supply and air outlet ducts during said rotation, means in said regeneratory body for preventing peripheral flow therethrough, and adjustable means in at least one of said gas supply ducts for controlling the gas flow therethrough.

2. A rotary regenerative air preheater as defined in claim 1 in which the regenerator body is subdivided into a plurality of sector-shaped compartments by radial walls, said radial walls constituting the means for preventing peripheral flow within the body.

3. A rotary regenerative air preheater as defined in claim 1 in which said casing is provided with at least one radially disposed branch conduit connection in flow communication with said means for providing said separating zone.

References Cited by the Examiner

UNITED STATES PATENTS

| 2,347,857 | 5/1944 | Waitkus | 165—7 |
| 2,913,228 | 11/1959 | Fikenscher | 165—7 |

FOREIGN PATENTS

| 1,113,534 | 9/1961 | Germany. |

ROBERT A. O'LEARY, *Primary Examiner.*

A. DAVIS, *Assistant Examiner.*